United States Patent [19]
Heidemann et al.

[11] Patent Number: 6,078,950
[45] Date of Patent: *Jun. 20, 2000

[54] ELECTRICAL TRANSMISSION SYSTEM WITH A BROADBAND DISTRIBUTION NETWORK FOR TV AND AUDIO SIGNALS AND WITH INTERACTIVE SERVICE CAPABILITY

[75] Inventors: Rolf Heidemann, Tamm; Heinz Krimmel, Korntal, both of Germany

[73] Assignee: Alcatel NV, Rijswijk, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/699,988

[22] Filed: Aug. 20, 1996

[30] Foreign Application Priority Data

Aug. 24, 1995 [DE] Germany .......................... 195 31 118

[51] Int. Cl.[7] .............................. H04N 7/14; H04N 1/02; H04L 12/413
[52] U.S. Cl. ................................ 709/217; 348/7; 348/12; 348/13; 370/447; 370/486; 455/5.1
[58] Field of Search .................................. 348/7, 12, 11, 348/13, 8; 455/4.2, 5.1; 379/90.01; 370/445–447, 485–486; 709/217–219

[56] References Cited

U.S. PATENT DOCUMENTS

| | | | |
|---|---|---|---|
| 4,754,426 | 6/1988 | Rast et al. ................................. | 358/86 |
| 5,093,718 | 3/1992 | Hoarty et al. .............................. | 455/5 |
| 5,408,260 | 4/1995 | Arnon . | |
| 5,488,413 | 1/1996 | Elder et al. ................................ | 348/13 |
| 5,528,582 | 6/1996 | Bodeep et al. ............................ | 370/24 |
| 5,559,858 | 9/1996 | Beveridge .................................. | 379/56 |
| 5,606,725 | 2/1997 | Hart .......................................... | 455/5.1 |
| 5,675,732 | 10/1997 | Majeti et al. ....................... | 395/200.01 |
| 5,712,903 | 1/1998 | Bartholomew et al. .................. | 379/89 |

FOREIGN PATENT DOCUMENTS

| | | |
|---|---|---|
| 3416036 | 10/1985 | Germany . |
| 4340076 | 6/1995 | Germany . |
| 4342775 | 6/1995 | Germany . |

OTHER PUBLICATIONS

"An Architecture for Interactive Applications" by Gelman et al. Proceedings of the Intern'l Conference on Communications Geneva, May 23–26, 1993, pp. 848 –852.

"Access Network Structures for Interactive Video Services" Part 1, The TV Engineer, 48th Year, Aug. 1994 by H. Hessenmüller et al, pp. 1 –32.

"Standard for Set–Top Boxes", Radio Show No. 17/95, pp. 42 –44.

"V.34 Modems with Cunning" and "V.34 Modems: Tip;s & Tricks", Radio Show No. 16/95, pp. 54 –58.

"Efficient Usages of Existing Local Copper Line Connection Networks" by H.W. Wellhausen.

The Communications Engineer, 47th. Year, Aug./Sep. 1993, chapter 3.5, pp. 31 –34.

*Primary Examiner*—John W. Miller
*Attorney, Agent, or Firm*—Ware, Fressola, Van Der Sluys & Adolphson LLP

[57] ABSTRACT

An electrical transmission system is indicated, in which a broadband distribution network (2) has a center (1) and a number of terminals (26) connected thereto, which can receive TV and Audio signals emitted by the center (1), and individual subscriber signals, and which can send upstream signals to the center (1). The broadband distribution network (2) has a number of amplifiers (10) that are close to the subscribers, to which a group of terminals (26) is connected, each of which is connected to a back-channel facility (4). The back-channel facility (4) is connected to a two-wire line (21) which is indirectly connected to the center (1). The back-channel facility (4) evaluates the upstream signals sent by a group of terminals (26).

13 Claims, 3 Drawing Sheets

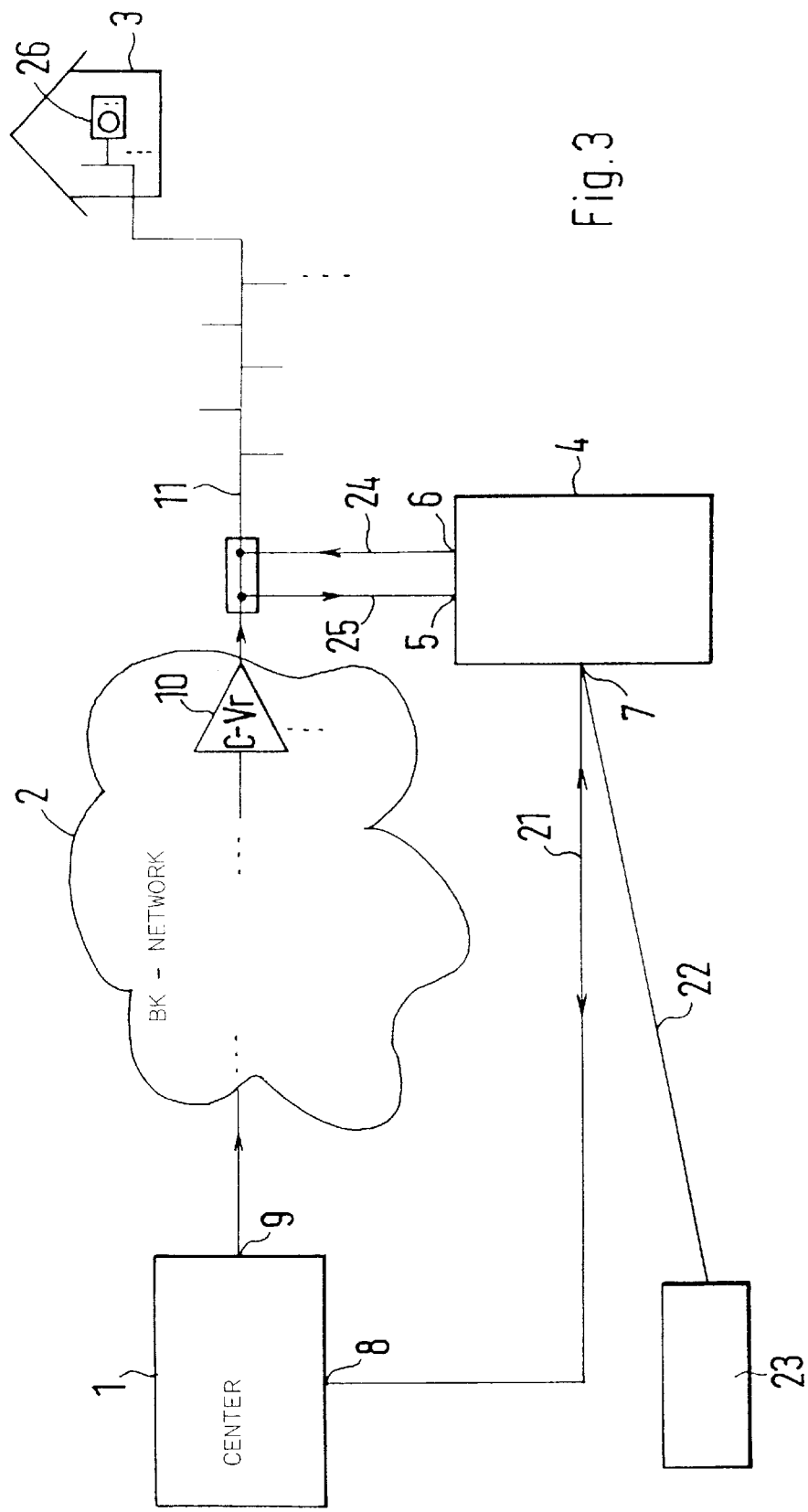

ELECTRICAL TRANSMISSION SYSTEM WITH A BROADBAND DISTRIBUTION NETWORK FOR TV AND AUDIO SIGNALS AND WITH INTERACTIVE SERVICE CAPABILITY

TECHNICAL FIELD

The invention concerns a transmission system wherein a broadband distribution network has a center and a plurality of subscriber terminals connected thereto, the subscriber terminals being capable of receiving television and sound broadcast signals, or other signals to be distributed, and subscriber-assigned signals from the center, and of transmitting upstream signals to the center, and wherein the broadband distribution network comprises a plurality of amplifiers each of which has a group of subscriber terminals connected thereto by an access network section. It is also directed to a back-channel facility for such a transmission system.

BACKGROUND OF THE INVENTION

Such a transmission system is e.g. a broadband distribution network known from H. Hessenmüller et al. "Access Network Structures for Interactive Video Services", Part 1, The TV Engineer, 48th. Year, August 1994. A summary therein describes broadband distribution networks, which are also called BK networks, and which have A-cable lines, B-cable lines, C-cable lines and D-cable lines established in the network plane 3 (picture 3). The C-cable lines contain the last active elements of the network plane 3, the C-amplifiers. These are the network operator amplifiers that are closest to the subscribers in the BK network. The D-cable lines, which represent access network sections, start at the C-cable line branches and always end at a transfer point. In an upstream BK amplifier station, all TV and Radio programs are combined into a uniform program offer and distributed to the BK amplifier stations on the user side, which are usually found in local exchanges. Starting from the BK amplifier stations, the TV and Radio programs are distributed to the subscribers (customers) in the downstream direction.

To also create the possibility of interactive services in such BK networks, i.e. the so-called service-on-demand (SoD) services such as video-on-demand (VoD), in addition to the unidirectional services in the downstream direction (TV and Radio signals), a (physical) back-channel must be provided in each BK network for sending signals in the upstream direction. This allows subscribers to send useful data to the SoD exchange and to a server network, e.g. to request information. A back-channel and a control channel are required for an interaction between the service offerer and a subscriber. There, among other things, the back-channel supports the identification of the customer, the establishment and termination of the connection, and the interaction of the customer with the SoD exchange and the server. Each customer has an individual back-channel available for the duration of the service usage. In current BK networks a frequency range of about 5–30 MHz is provided for the back-channels, and a frequency range of about 40–300 MHz (450 MHz, hyperband) for the TV channels. One request to the back-channel is e.g. for the reaction time to remain within justifiable limits until a command entered via a terminal (TV set with a set-top box) becomes effective.

Chapter 3.4 of the cited publication investigates solutions for the back-channel, with the result that access or transmission methods for the back-channel in large networks must be developed in multiple stages, and for the case of central access control the center must be shifted in the direction toward the customer. In that respect picture 12 illustrates a two-step back-channel concept. Starting with the general structure of a BK network, a back-channel transmitter with an access control is installed in a C-amplifier. ATM is cited as the transmission mode. The back-channel data from all the terminals of the respective network segment are combined in a time-division multiplex mode, then cell structured and provided with an individual nodal address. Cell multiplexers are located in nodal points of the network having a branching function in the downstream direction.

In this way the coaxial cable-based BK network is used for the back-channel up to the amplifier station on the user side. To make this possible, the BK network must be "back-channel capable", i.e. all amplifiers in the BK network must be able to pass or regenerate signals which expand in the upstream direction (upstream signals). This takes place in that the upstream signals in the back-channel bypass each individual amplifier with the aid of cross-overs, or they are actively amplified together. Making existing BK networks "back-channel capable" is therefore connected with high costs. Furthermore each cross-over also attenuates the downstream signals.

SUMMARY OF THE INVENTION

The invention therefore has the task of presenting a cost-effective transmission system, whereby TV and Radio signals are sent via a broadband distribution network and which includes a possibility for interactive services. A transmission system which fulfills the task is characterized in that at least one of the amplifiers or at least one of the access network sections has a back-channel facility connected thereto which is connected to a two-wire line coupled directly or indirectly to the center, that the back-channel facility receives the upstream signals from the subscriber terminals, and the back-channel facility transmits the received upstream signals to the center according to a protocol which governs multiple access by the subscriber terminals to the two-wire line. A central element of the transmission system according to the invention is a back-channel facility. Such a back-channel facility comprises a regenerator, a receiving device connected to the regenerator for receiving upstream signals, and a transmitting device connected to the regenerator for transmitting acknowledgement and downstream signals to the subscriber terminals, which acknowledgement and downstream signals can enter the back-channel facility at a port to which a two-wire line is connectable, said back-channel facility further comprising either an ADSL or HDSL termination, which is connected to the regenerator and the port, or a modulator-demodulator, which is also connected to the regenerator and the port, the regenerator comprising means for processing upstream signals according to the multiple-access protocol, so that the upstream signals leave the back-channel facility at the port collision-free.

One advantage of the invention is that existing BK networks require very little change, namely e.g. only in the C-amplifiers and in the center.

Another advantage of the invention is that new and possibly expanded frequency ranges of the passive C- and D-cable lines can be used in both the upstream and the downstream direction in order to make an expanded service offer available, and that is without having to adapt or replace the amplifiers.

BRIEF DESCRIPTION OF THE DRAWINGS

In the following the invention is explained in greater detail as an example by means of drawings, where:

FIG. 3 is a second configuration example of the transmission system.

BEST MODE FOR CARRYING OUT THE INVENTION

Figure 1:
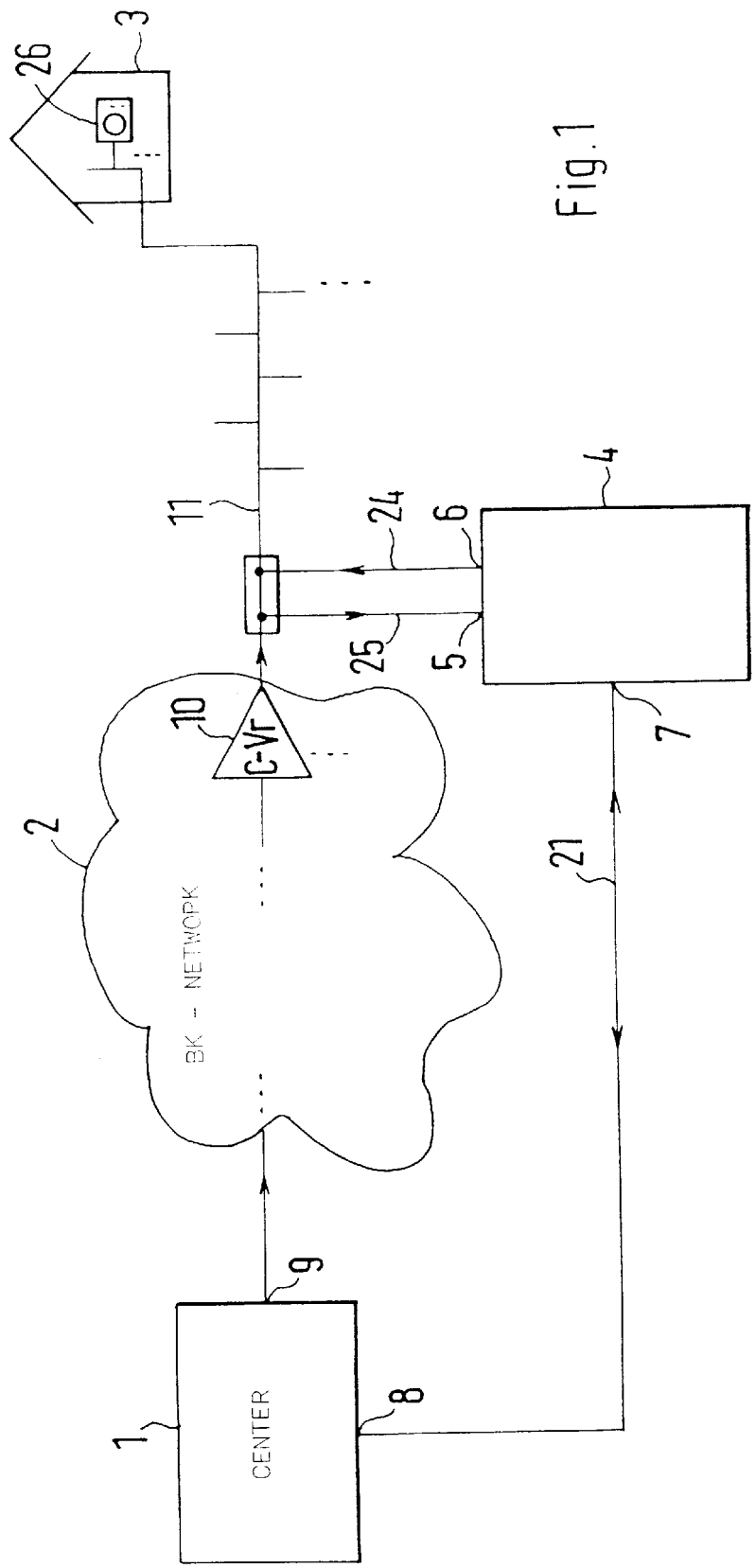
FIG. 1 is a first schematic configuration example of a transmission system with a back-channel facility.

FIG. 1 illustrates a first configuration example of a transmission system, which is e.g. an electrical transmission system in which a center 1 and a number of subscriber terminals 26, hereafter called terminals, are connected to a broadband distribution network 2, hereafter called BK network. The coaxial cable-based BK network 2 is sufficiently well known, so that it is only schematically indicated, and only an amplifier 10, which is also called C-amplifier, has been drawn. A group of terminals 26 is connected to these amplifiers 10 that are located close to the subscribers, via a passive access network section 11, also called C-/D-plane. This is indicated in FIG. 1 by one of many buildings in which one or more terminals 26 are located. The following description will not explicitly mention a domestic distribution network which exists in each building 3. The terminals 26 are e.g. TV sets connected to an additional facility designed for interactive services, called set-top box, through which the subscribers can request and control a service. Set-top boxes are known e.g. from the article "Standard for Set-Top Boxes", Radio Show no. 17/95, pages 42 to 44, which contains a summary of the functionality of set-top boxes.

In the electrical transmission system, the center 1 sends TV and Radio signals which correspond to the usual norms, to the subscriber terminals 26. But in addition to said TV and Radio signals, other signals (e.g. data signals) can also be transmitted from the center 1, which are also distributed via the BK network. In addition, the center 1 can send subscriber-individualized signals, in order to offer the subscribers e.g. films or audio programs at their request (e.g. video-on-demand). To that end the center 1 comprises a network of video servers.

A back-channel facility 4 is connected to the passive access network section 11, which has ports 5, 6 for the lines 24, 25 that are connected to the access network section 11. In addition, the back-channel facility 4 has a further port 7, to which a two-wire line 21 is connected, which thereby indirectly connects the back-channel facility 4 with a port 8 of the center 1. In this instance "indirectly" means that the back-channel facility 4 is directly connected to the two-wire line 21, but the other end of the two-wire line 21 can be connected to a further transmission medium, e.g. an optical waveguide, in order to establish the connection with the center 1 in this manner. In this case the upstream signals are first transmitted electrically via the two-wire line 21, then they are electro-optically converted at an interface between the two-wire line 21 and the optical waveguide, and subsequently they are optically transmitted to the center 1. The two-wire line 21 is a double copper conductor of the kind normally used for the telephone network.

The back-channel facility 4 together with the amplifier 10, the C-amplifier, are preferably located at a common place (known as the C-amplifier point) in such a way that the lines 24, 25, when viewed in the upstream direction, are connected to the passive access network section 11 before the amplifier 10. In principle however, the back-channel facility 4 can be connected to the passive access network section 11 at any place. The connection of lines 24, 25 to the passive access network section 11 takes place e.g. via frequency cross-overs and adders, or generally via a duplexer. Although the BK network 2 illustrated in FIG. 1 only has one amplifier 10 and one back-channel facility 4, it goes without saying that a back-channel facility 4 can be provided for each amplifier.

If several subscribers of a group want to use one of the services simultaneously, i.e. several terminals 26 want to use the same back-channel, the center 1 must detect the origin of each upstream signal, namely of each request. For that reason requests made from the terminals 26 are divided into packets (or blocks), and a sender address is added to each packet, e.g. a terminal identification. Each packet comprises a header part with address information and a part for useful information (payload). The communication between the terminals 26 and the back-channel facility 4 uses the known Aloha protocol or the "slotted" Aloha protocol. But it is also possible to use other known protocols. The packets are sent in the TDMA mode.

Since in the simplest of cases the terminals emit the requests independently of each other (Aloha protocol), it is a task of the back-channel facility 4 of the invention to already test these requests, which are sent in uncoordinated form, in the C-plane with regard to whether the individual packets are received undisturbed and without reciprocal overlapping (collisions) by the back-channel facility 4. If the back-channel facility 4 determines that one or more packets were not received in a trouble-free manner, the back-channel facility 4 can request the concerned terminals 26 to repeat said packets as many times as necessary. Only packets that were received trouble-free are sent by the back-channel facility 4 to the center 1 via the two-wire line 21. The back-channel facility 4 can be designed to additionally acknowledge in principle each packet that was received trouble-free.

It can be seen from the preceding that a communication between the terminals 26 and the back-channel facility 4 takes place according to an established protocol. In that way the back-channel facility 4, among other things, has a regenerator and filter function which precedes the center 1, so that the center 1 only receives trouble-free packets. The center 1 therefore does not require a protocol process as described earlier; the center 1 is therefore not responsible for the detection of potential collisions. This has the advantage of reducing the time the subscribers must wait until they receive a reaction to their requests. Because the back-channel facility 4 is located very near the terminals 26 (typically <300 m), the running time plays no part in the passive access network section 11, and a high data throughput rate is assured. The upstream signals propagating in the two-wire line 21, which propagate without collisions, can have a lower transmission speed at the same data throughput rate.

The construction of the back-channel facility 4 is explained in the following by means of the block diagram in FIG. 2. The back-channel facility 4 comprises a receiving device 12, a transmitting device 13, a regenerator 9 and a modulator-demodulator 27.

The cited devices 12, 13, 27 and the regenerator 9 are interconnected as follows: the receiving device 12 is connected to the port 5 of the back-channel facility 4 and receives the upstream signals emitted by the individual terminals 26, which are modulated for a subcarrier. One output 14 of the receiving device 12 is connected to an input 15 of the regenerator 9, which is thereby able to receive the (demodulated) upstream signals. One output 17 of the regenerator 9 is connected to an input 16 of the transmitting device 13, which is connected to port 6 of the back-channel facility 4. One output 18 of the regenerator 9 is connected to an input 19 of the modulator-demodulator 27, which has an input-output 20 that is connected to port 7. The regenerator 9 receives the upstream signals sent in the TDMA mode by the receiving device 12, and sends signals to the transmitting device 13 in the TDMA mode.

The upstream signals, which are modulated in the frequency band of e.g. 5–30 MHz for a subcarrier (auxiliary carrier) that is common to the group of terminals, are demodulated by the receiving device 12 so that the upstream signals are in the baseband after the demodulation, e.g. as NRZ signals. Thus the receiving device 12 essentially has the function of a demodulator.

Figure 2:
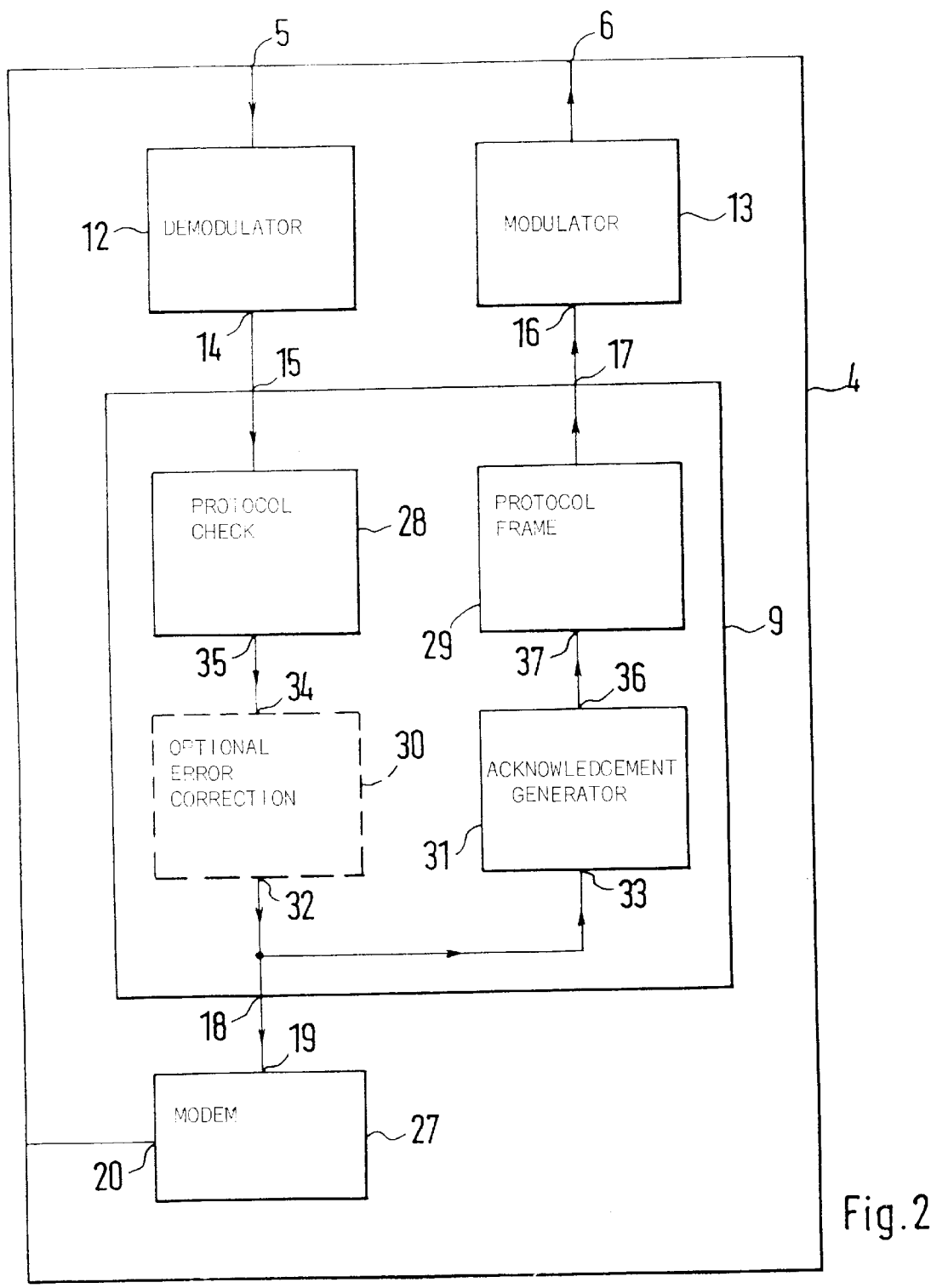
FIG. 2 is a block diagram of the back-channel facility.

The demodulated upstream signals are directed to a check device 28 in the regenerator 9, which checks the protocol used for the communication; for clarification, the function of the check device 28 is designated and drawn in FIG. 2 as a protocol check. The check device 28 checks whether the upstream signals emitted as packets by the terminals 26 are received trouble-free, i.e. whether there are packet collisions or if errors occur inside the packets. Since the check device 28 only lets trouble-free packets pass, it has among others a filter function, as mentioned.

One output 35 of the check device 28 is connected to an input 34 of a correction device 30, which has an output 32 connected to the output 18 of the regenerator 9 and to an input 33 of an acknowledgment signal generator 31. This correction device 30 is not always required; for that reason it is drawn by broken lines in FIG. 2. It is not required if minor individual errors are accepted during transmission of the upstream signals, the design of the electrical transmission system includes a certain error tolerance, and the individual errors can be detected and/or corrected in another part of the electrical transmission system. Then, if no correction device 30 is required, the output 35 of the check device 28 is directly connected to the output 18 of the regenerator 9 and the input 33 of the acknowledgment signal generator 31.

The acknowledgment signal generator 31 produces acknowledgment signals as a function of the packets checked by the check device 28, which are sent to the terminals 26. Depending on which protocol is used, an acknowledgment signal can mean that packets have collided and must therefore be sent anew, or that the packets were received trouble-free. The produced acknowledgment signals exit from the acknowledgment signal generator 31 via an output 36, and enter a frame unit 29 via an input 37.

The frame unit 29 prepares the received acknowledgment signals, and possibly operational and useful information signals sent by the center 1 via the two-wire line 21, in such a way that they are inserted into frames which correspond to the protocol used, and are transmitted to the output 17 of the regenerator 9 and then sent to the transmitting device 13.

The transmitting device 13 is a modulator which modulates a subcarrier by means of the acknowledgment signals and the operational and useful information signals. This converts said signals, which are e.g. NRZ signals, into HF signals. By choosing the subcarrier, a channel can be occupied e.g. in the frequency band of 40–450/600 MHz.

The transmitting device 13 and the receiving device 12 can also be present in multiple form, so that one further device is available for each potential further service.

The modulator-demodulator 27, called modem in the following, has among other things the task of preparing the upstream signals for transmission via the two-wire line 21. Such a preparation comprises e.g. providing the upstream signals with an error protection in order to guarantee a secure transmission. Modems which can be connected to a two-wire line and whose technical details (e.g. bit rate (64 kbit/s ISDN transmission in the baseband) and interface protocol (V.34)) are sufficiently well known (see e.g. "V.34 Modems with Cunning" and "V.34 Modems: Tips & Tricks", Radio Show no. 16/95, pages 54 to 58).

The protocol process for multiple access to the electrical transmission system illustrated in FIG. 1, takes place exclusively in the C-/D-plane. An efficient subcarrier modulation method is used in the C-/D-plane. This has the additional advantage that different modulation methods and protocols can be used side by side.

With the above described electrical transmission system it is possible to perform some modifications when necessary, which are described in the following. However the basic concept of the invention is maintained, even when such modifications are performed.

In the first modification, a network termination for the ADSL technology can be used instead of the modem, which is known e.g. from H. -W. Wellhausen's "Efficient Usage of Existing Local Copper Line Connection Networks", The Communications Engineer, 47th. Year, August/September 1993, particularly chapter 3.5, pages 31–34. From there it is known that ADSL technology provides a transmission with a high bit rate in the direction of the subscriber (downstream signals) and a transmission with a low bit rate from the subscriber to the center (upstream signals). The transfer to the subscriber takes bit rates between 1.544 Mbit/s and 6 Mbit/s into consideration. By contrast, the transfer of control information from the subscriber to the center takes bit rates of some 10 kbit/s into consideration.

The ADSL technology also implements an error protection which detects errors in the received signal and can partially correct them. A Reed-Solomon code is used e.g. to that effect. It encodes a bit stream to be sent before the bits are distributed to the individual subcarriers. In addition, an optional Trellis code can be implemented for each subcarrier, which provides additional noise immunity.

The electrical transmission system uses the known ADSL technology "in reverse", i.e. the transmission of upstream signals to the center takes place at the high bit rate, which makes new telecommunication services possible.

The second modification can also use a network termination for the HDSL technology instead of the modem, which is also known in connection with ADSL technology publications. The HDSL technology is a bidirectional transmission of signals at the same bit rate, e.g. 2 Mbit/s. In addition to the connection to the output 18 of the regenerator 9 which receives the upstream signals, the network termination for the HDSL technology has a connection to the transmitting device 13, in order to direct the signals sent by the center to the one, or to one of several transmitting devices 13, while bypassing the regenerator 9.

FIG. 3 illustrates a second configuration example of an electrical transmission system, which is a modification of the electrical transmission system illustrated in FIG. 1. The electrical transmission system components already drawn in FIG. 1 use the same reference symbols in FIG. 3. The following only refers to the changes in the electrical transmission system required by the modification. One such change is that a second two-wire line 22 is connected to the port 7 of the back-channel facility 4, which establishes a connection to a switching equipment 23. This switching equipment 23 is part of a network that is independent of the BK network 2. A further change is that the already mentioned network termination for HDSL signals is located in the back-channel facility 4.

In this way a bidirectional transmission of signals is made possible via both two-wire lines 21, 22; the bit rate of the signals is e.g. 2 Mbit/s. The possibility of a bidirectional transmission of signals to the terminals 26 exists. In the unchanged form, the BK network 2 is only suitable for the unidirectional transmission in higher placed network sections, namely from the center 1 to the terminals 26.

What is claimed is:

1. A transmission system wherein a broadband distribution network (2) has a center (1) and a plurality of subscriber terminals (26) connected thereto, the subscriber terminals (26) being capable of receiving television, sound, and data signals to be distributed, and subscriber-assigned signals from the center (1), and of transmitting upstream signals to the center (1), and wherein the broadband distribution network (2) comprises a plurality of amplifiers (10) each of which has a group of subscriber terminals (26) connected thereto by an access network section (11), characterized in that at least one of the amplifiers (10) or at least one of the access network sections (11) has a back-channel facility (4) connected thereto which is also connected to a separate two-wire line (21) coupled directly or indirectly to the center (1), that the back-channel facility (4) receives the upstream signals from the subscriber terminals (26) of said group of subscriber terminals, and the back-channel facility (4) transmits the received upstream signals to the center (1) according to a protocol which governs multiple access by the subscriber terminals (26) to the two-wire line (21), said protocol determining if each upstream signal from any subscriber terminal (26) in said group of subscriber terminals is received without collision with any other subscriber signal, and if so the subscriber signal is communicated to the center (1) by the back-channel facility (4), and otherwise the back-channel facility (4) requests that each subscriber terminal (26) from which an upstream signal was received with collision, retransmit said upstream signal; and further characterized in that the back-channel facility (4) comprises a regenerator (9), a receiving device (12) connected to the regenerator (9) for receiving the upstream signals, a transmitting device (13) connected to the regenerator (9) for transmitting acknowledgement and downstream signals to the subscriber terminals (26), which acknowledgement and downstream signals can enter the back-channel facility (4) at a port (7) connectable to the two-wire line (21), and a modulator-demodulator (27) connected to the regenerator (9) and the two-wire line (21), and that the regenerator (9) comprises means (28, 29, 30, 31) for processing the upstream signals according to the multiple-access protocol, so that the upstream signals are transmitted to the center (1) collision-free.

2. A transmission system as claimed in claim 1, characterized in that the transmitting device (13) and the receiving device (12) use a subcarrier modulation method.

3. A transmission system as claimed in claim 1, characterized in that more than one transmitting device (13) and more than one receiving device (12) are provided.

4. A transmission system as claimed in claim 1, characterized in that the regenerator (9) comprises a check device (28) connected to the receiving device (12), an acknowledgement signal generator (31) connected to the check device and the modulator-demodulator (27) or to a network termination, and a frame unit (29) connected to the acknowledgement signal generator (31) and the transmitting device (13), that the check device (28) checks the protocol used, that the acknowledgement signal generator (31) produces acknowledgement signals, and that the frame unit (29) inserts the acknowledgement signals and the downstream signals into frames which correspond to the protocol used and are transmitted by the transmitting device (13).

5. A transmission system wherein a broadband distribution network (2) has a center (1) and a plurality of subscriber terminals (26) connected thereto, the subscriber terminals (26) being capable of receiving television, sound, and data signals to be distributed, and subscriber-assigned signals from the center (1), and of transmitting upstream signals to the center (1), and wherein the broadband distribution network (2) comprises a plurality of amplifiers (10) each of which has a group of subscriber terminals (26) connected thereto by an access network section (11), characterized in that at least one of the amplifiers (10) or at least one of the access network sections (11) has a back-channel facility (4) connected thereto which is also connected to a separate two-wire line (21) coupled directly or indirectly to the center (1), that the back-channel facility (4) receives the upstream signals from the subscriber terminals (26) of said group of subscriber terminals, and the back-channel facility (4) transmits the received upstream signals to the center (1) according to a protocol which governs multiple access by the subscriber terminals (26) to the two-wire line (21), said protocol determining if each upstream signal from any subscriber terminal (26) in said group of subscriber terminals is received without collision with any other subscriber signal, and if so the subscriber signal is communicated to the center (1) by the back-channel facility (4), and otherwise the back-channel facility (4) requests that each subscriber terminal (26) from which an upstream signal was received with collision, retransmit said upstream signal; and further characterized in that the back-channel facility (4) comprises a regenerator (9), a receiving device (12) connected to the regenerator (9) for receiving the upstream signals, a transmitting device (13) connected to the regenerator (9) for transmitting acknowledgement and downstream signals to the subscriber terminals (26), which acknowledgement and downstream signals can enter the back-channel facility (4) at a port (7) connectable to the two-wire line (21), and an ADSL termination connected to the regenerator (9) and the two-wire line (21), and that the regenerator (9) comprises means (28, 29, 30, 31) for processing the upstream signals according to the multiple-access protocol, so that the upstream signals are transmitted to the center (1) collision-free.

6. A transmission system wherein a broadband distribution network (2) has a center (1) and a plurality of subscriber terminals (26) connected thereto, the subscriber terminals (26) being capable of receiving television, sound, and data signals to be distributed, and subscriber-assigned signals from the center (1), and of transmitting upstream signals to the center (1), and wherein the broadband distribution network (2) comprises a plurality of amplifiers (10) each of which has a group of subscriber terminals (26) connected thereto by an access network section (11), characterized in that at least one of the amplifiers (10) or at least one of the access network sections (11) has a back-channel facility (4) connected thereto which is also connected to a separate two-wire line (21) coupled directly or indirectly to the center (1), that the back-channel facility (4) receives the uipstream signals from the subscriber terminals (26) of said group of subscriber terminals and the back-channel facility (4) transmits the received upstream signals to the center (1) according to a protocol which governs multiple access by the subscriber terminals (26) to the two-wire line (21), said protocol determining if each upstream signal from any subscriber terminal (26) in said group of subscriber terminals is received without collision with any other subscriber signal, and if so the subscriber signal is communicated to the center (1) by the back-channel facility (4), and otherwise the back-channel facility (4) requests that each subscriber terminal (26) from which an upstream signal was received with collision, retransmit said upstream signal; and further characterized in that the back-channel facility (4) comprises a regenerator (9), a receiving device (12) connected to the regenerator (9) for receiving the upstream signals, a transmitting device (13) connected to the regenerator (9) for transmitting acknowledgement and downstream signals to the subscriber terminals (26) which acknowledgement and downstream signals can enter the back-channel facility (4) at a port (7) connectable to the two-wire line (21), and an HDSL termination connected to the regenerator (9) and the two-wire line (21), and that the regenerator (9) comprises means (28, 29, 30, 31) for processing the upstream signals according to the multiple-access protocol, so that the upstream signals are transmitted to the center (1) collision-free.

7. A transmission system as claimed in claim 6, characterized in that the transmitting device (13) and the receiving device (12) use a subcarrier modulation method.

8. A transmission system as claimed in claim 6, characterized in that more than one transmitting device (13) and more than one receiving device (12) are provided.

9. A transmission system as claimed in claim 6, characterized in that the regenerator (9) comprises a check device (28) connected to the receiving device (12), an acknowledgement signal generator (31) connected to the check device and the modulator-demodulator (27) or to a network termination, and a frame unit (29) connected to the acknowledgement signal generator (31) and the transmitting device (13), that the check device (28) checks the protocol used, that the acknowledgement signal generator (31) produces acknowledgement signals, and that the frame unit (29) inserts the acknowledgement signals and the downstream signals into frames which correspond to the protocol used and are transmitted by the transmitting device (13).

10. A transmission system wherein a broadband distribution network (2) has a center (1) and a plurality of subscriber terminals (26) connected thereto, the subscriber terminals (26) being capable of receiving television, sound, and data signals to be distributed, and subscriber-assigned signals from the center (1), and of transmitting upstream signals to the center (1), and wherein the broadband distribution network (2) comprises a plurality of amplifiers (10) each of which has a group of subscriber terminals (26) connected thereto by an access network section (11), characterized in that at least one of the amplifiers (10) or at least one of the access network sections (11) has a back-channel facility (4) connected thereto which is also connected to a separate two-wire line (21) coupled directly or indirectly to the center (1), that the back-channel facility (4) receives the upstream signals from the subscriber terminals (26) of said group of subscriber terminals, and the back-channel facility (4) transmits the received upstream signals to the center (1) according to a protocol which governs multiple access by the subscriber terminals (26) to the two-wire line (21), said protocol determining if each upstream signal from any subscriber terminal (26) in said group of subscriber terminals is received without collision with any other subscriber signal, and if so the subscriber signal is communicated to the center (1) by the back-channel facility (4), and otherwise the back-channel facility (4) requests that each subscriber terminal (26) from which an upstream signal was received with collision, retransmit said upstream signal; and further comprising a regenerator (9), a receiving device (12) connected to the regenerator (9) for receiving upstream signals, and a transmitting device (13) connected to the regenerator (9) for transmitting acknowledgement and downstream signals to the subscriber terminals (26), which acknowledgement and downstream signals can enter the back-channel facility (4) at a port (7) to which a two-wire line (21) is connectable, said back-channel facility (4) further comprising either an ADSL or HDSL termination, which is connected to the regenerator (9) and the port (7), or a modulator-demodulator (27), which is also connected to the regenerator (9) and the port (7), the regenerator (9) comprising means (28, 29, 30, 31) for processing upstream signals according to the multiple-access protocol, so that the upstream signals leave the back-channel facility (4) at the port (7) collision-free.

11. A back-channel facility as claimed in claim 10, characterized in that the transmitting device (13) and the receiving device (12) use a subcarrier modulation method.

12. A back-channel facility as claimed in claim 10, characterized in that more than one transmitting device (13) and more than one receiving device (12) are provided.

13. A back-channel facility as claimed in claim 10, characterized in that the regenerator (9) comprises a check device (28) connected to the receiving device (12), an acknowledgement signal generator (31) connected to the check device and the modulator-demodulator (27) or to a network termination, and a frame unit (29) connected to the acknowledgement signal generator (31) and the transmitting device (13), that the check device (28) checks the protocol used, that the acknowledgement signal generator (31) produces acknowledgement signals, and that the frame unit (29) inserts the acknowledgement signals and the downstream signals into frames which correspond to the protocol used and are transmitted by the transmitting device (13).

* * * * *

UNITED STATES PATENT AND TRADEMARK OFFICE
CERTIFICATE OF CORRECTION

PATENT NO.    : 6,078,950
DATED         : June 20, 2000
INVENTOR(S)   : Rolf Heidemann and Heniz Krimmel It is certified that error appears in the above-identified patent and that said Letters Patent is hereby corrected as shown below:

In the drawings, Figure 1, after the box marked "Center", "9" should be deleted.

In the drawings, Figure 3, after the box marked "Center", "9" should be deleted.

In column 8, claim 6, line 17, after "terminals", --,-- should be inserted.

Signed and Sealed this

Third Day of April, 2001

Attest:

NICHOLAS P. GODICI

*Attesting Officer*         *Acting Director of the United States Patent and Trademark Office*